United States Patent [19]

Yasui et al.

[11] Patent Number: 4,937,424

[45] Date of Patent: Jun. 26, 1990

[54] LASER MACHINING APPARATUS

[75] Inventors: Koji Yasui; Masaaki Tanaka; Shigenori Yagi; Masaki Kuzumoto, all of Hyogo, Japan

[73] Assignee: Mitsubishi Denki Kabushiki Kaisha, Tokyo, Japan

[21] Appl. No.: 221,801

[22] Filed: Jul. 20, 1988

[30] Foreign Application Priority Data

Jul. 20, 1987 [JP] Japan ................................ 62-179144
Jul. 23, 1987 [JP] Japan ................................ 62-182354
Dec. 9, 1987 [JP] Japan ................................ 62-311357

[51] Int. Cl.$^5$ .............................................. B23K 76/00
[52] U.S. Cl. .............................. 219/121.6; 219/121.67; 219/121.75; 219/121.85; 372/95
[58] Field of Search .................... 219/121.74, 121.75, 219/121.6, 121.85, 121.67, 121.72; 372/95, 99

[56] References Cited

U.S. PATENT DOCUMENTS

| | | | |
|---|---|---|---|
| 3,586,816 | 6/1971 | Hagen | 219/121.75 X |
| 3,981,230 | 9/1976 | Lee | 219/121.82 X |
| 4,287,482 | 9/1981 | Wert | 372/99 X |
| 4,327,129 | 4/1982 | Sepp | 427/164 |
| 4,336,435 | 6/1982 | Sasnetti et al. | 219/121.75 X |
| 4,358,659 | 11/1982 | Spahnheimer | 219/121.75 X |
| 4,553,244 | 11/1985 | Benedict et al. | 372/99 X |

FOREIGN PATENT DOCUMENTS 0039491 3/1984 Japan ................................ 219/121.64

Primary Examiner—C. L. Albritton
Attorney, Agent, or Firm—Sughrue, Mion, Zinn, Macpeak & Seas

[57] ABSTRACT

A laser machining apparatus includes a laser resonator capable of producing a laser beam having a filled-in intensity distribution pattern and a condensing device for converting the beam into a suitable beam to perform an intended machining. A device is provided for regulating phase of the laser beam to improve the condensed laser beam. The apparatus may also include a device for pulsating the beam and a device for changing a focal depth of the beam.

21 Claims, 24 Drawing Sheets

FIG. 17(a)
FIG. 17(b)
FIG. 18
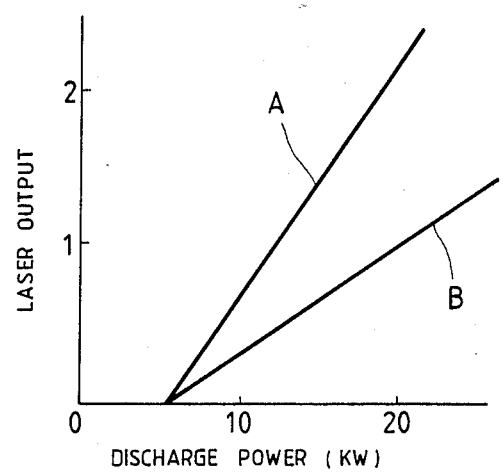
FIG. 19
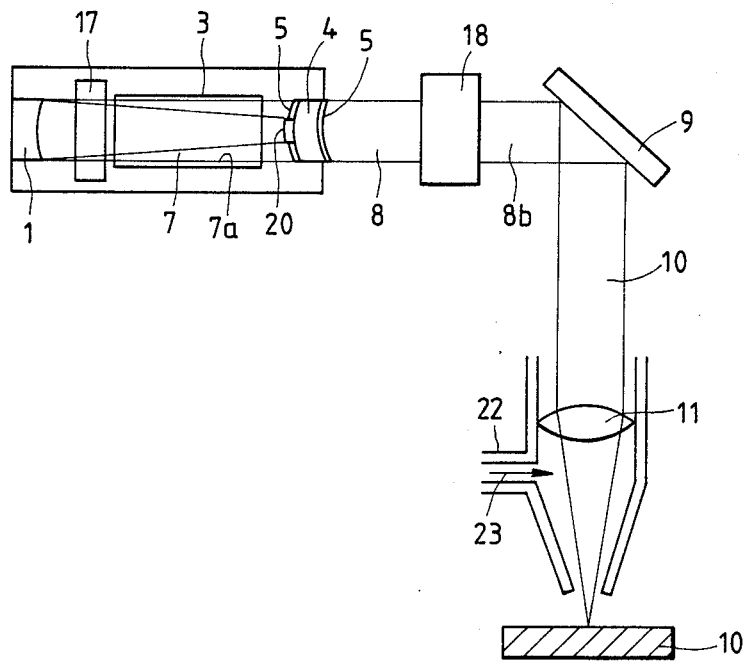

LASER MACHINING APPARATUS

BACKGROUND OF THE INVENTION

The present invention relates to a laser machining apparatus capable of producing a high quality laser beam.

FIG. 38 illustrates a conventional laser machining apparatus for use in improving the surface quality of a metal workpiece, thickening a metal workpiece or drying wet paper at high speed. In FIG. 38, a reference numeral 1 depicts a full reflection mirror, 3 a laser medium, 4 an output mirror, 7 a laser beam generated in a laser resonator 6 constituted with the full reflection mirror 1 and the output mirror 4, 8 an output laser beam derived from the laser resonator 6, 9 a bend mirror, 8a a laser beam bent by the bend mirror 9 and 10 a workpiece. Further, a reference numeral 5 depicts a non-reflection coating formed on an outer surface of the output mirror 4 and 5a a partial reflection coating formed on an inner surface of the output mirror 4 to make the output mirror 4 partially reflective.

In operation, the laser beam 7 reciprocating between the full reflection mirror 1 and the output mirror 4 is amplified by the laser medium 3 and a portion thereof is derived from the output mirror 4 as the output laser beam 8 having power distribution such as shown in FIG. 39. The laser beam 8 is guided by the bend mirror 9 to the workpiece 10 to improve the surface quality thereof or thickening it when the workpiece 10 is a metal workpiece or drying it at high speed when the workpiece is wet paper.

It is usual in such laser machining apparatus to increase the output power by making the laser medium large so that a higher speed machining is realized. In such a case, however, in order to derive the output laser beam efficiently from the laser medium, it is necessary to make a cross sectional area of the laser beam 7 in the resonator 6 large. The intensity distribution : transverse mode thereof becomes the so-called higher mode described in, for example, "Basic Optoelectronics", Maruzen, 1974.

FIG. 40 illustrates an example of a laser machining apparatus for cutting and/or welding workpieces which is disclosed in M. Hamazaki, "Practical Laser Machinings", Tech Publishing Co., Feb. 20, 1986. In FIG. 40, a laser beam 8 derived from a laser resonator 6 is guided by a bend mirror 9 to a condenser lens 11 as a laser beam 8a to obtain a high power concentration and machines, together with laser gas 23 guided from a gas inlet port 22, a workpiece 10

In order to realize a high performance laser machining, a high quality, high power laser beam is required. The high quality requirement is achieved in the apparatus in FIG. 40 by limiting an outer diameter of the laser beam by means of an aperture 21. When the diameter of the aperture is small enough, a Gaussian beam is produced as shown in FIG. 41a. Since such beam can be condensed by the condenser lens 11, a high power concentration laser beam is obtained as shown in FIG. 41b. On the other hand, when the diameter of the aperture 21 is large, a condensation of the laser beam is degraded, resulting in a ring shaped laser beam output having high multi modes as shown in FIG. 41c.

FIG. 42 is a graph showing a cutting performance of the apparatus in FIG. 40 when an iron plate is cut thereby, in which a curve A corresponds to a case when the cutting is performed with multimode laser beam of 1000 W and B corresponds to a cutting with Gaussian-mode laser beam of 500 W. As is clear from FIG. 42, the cutting performance B is superior to A although the laser power for A is larger than that for B. That is, the mode quality of laser beam is very important in laser machining.

FIG. 43 illustrates another example also shown in "Practial Laser Machinings" mentioned above. In FIG. 43, a laser beam 7 reciprocating between an output mirror 4 and a full reflection mirror 1 of a resonator is amplified by a laser medium 3 and, when an intensity of the beam exceeds a predetermined level, a portion thereof is derived as a laser beam 8 which is condensed by a condensing or machining lens 11 and a resultant high power beam is directed to a workpiece 10 to machine it.

In order to machine the workpiece 10 efficiently, an output power of the laser 8 must be derived stably from the output mirror 4. In order to realize the latter, it is necessary to lower the beam intensity by making a cross sectional area of the beam 7 larger. However, the laser beam 8 derived from the laser beam 7 and having large cross section is of multimode having an intensity distribution having substantially peaks at both ends thereof such as shown in FIG. 44a. When such beam is condensed by the machining lens 11, an intensity distribution of a resultant laser beam 8b has very sharp peaks at opposite ends thereof as shown in FIG. 44b.

FIGS. 45 and 46 show examples of a conventional composite laser machining apparatus such as disclosed in Japanese Patent Application Laid open No. 4282/1985 when applied to an welding and a hardening, respectively.

In FIG. 45, an expanding full reflection mirror 12 and a full reflective collimating mirror 1 constitute a unstable resonator 6 and a laser beam 15 reciprocating therebetween is amplified by a laser medium 3. An outer peripheral portion of the laser beam 15 is derived from a opened mirror 13 of the laser resonator 6 every reciprocation and after passed through a window 14 it is obtained as a ring shaped laser beam 15a which is condensed by a lens 11 and then directed to a workpiece 10.

In FIG. 46, a full reflection collimating mirror 1, a bend mirror 9 and a partial reflective mirror 14a constitute a stable resonator 6 and a portion of a laser beam 15 reciprocating between the collimating mirror 1 and the partial reflection mirror 14a is derived from the partial reflection mirror 14a and after condensed by a lens 11 directed to a workpiece 10.

FIG. 47a shows an intensity distribution of a laser beam 15a produced by the device shown in FIG. 45 and FIG. 47b shows an example of beam pattern of the laser beam 15a after condensed. That is, a ring shaped laser beam shown in FIG. 47a is condensed as a filled in beam having side peaks such as shown in FIG. 47b, due to an effect of diffraction. Since the pattern of the condensed beam has a center peak which is substantially high, it is effectively used in welding a workpiece 10, etc. However, due to such localized power concentration, it can not be used for surface treatment of workpiece which requires a uniform distribution of power. Further, since such ring shaped laser beam changes its pattern considerably around a focal plane, it is hardly to use such beam in cutting the workpiece which requires a large focal length.

FIGS. 48a, 48b and 48c show examples of variation of beam pattern shown in FIG. 47b when a ratio of outer diameter of the ring shaped laser beam which is 20 mm to inner diameter is 2 and a condenser lens has a focal distance 400 mm. FIG. 48a shows the pattern at a position on front side of the focal plane remote therefrom by 20 mm, FIG. 48b shows that at the focal plane and FIG. 48c shows at a position on rear side of the focal plane remote therefrom by 20 mm. As is clear from FIGS. 48a to 48c, the height of center peak is reduced on both sides of the focal plane and the side peaks are broadened.

In general, in a welding which requires high power concentration, it is considered that only laser power included in the center peak portion is used. In such case, calculation of percentage of power contained in the center peak to total power shows about 30% in the case of FIG. 48a, about 50% in the case of FIG. 48b and about 30% in the case of FIG. 48c. Therefore, it can be said that a distance in which a certain constant efficiency of laser machining, i.e., the focal depth, is small due to such change of intensity distribution pattern around the focal plane. For this reason, such ring shaped laser beam is not used for laser cutting.

For a surface treatment of workpiece 10, the apparatus is usually constituted with a stable resonator such as shown in FIG. 46 in which the mirror 13 having the hole and used in FIG. 45 is replaced by a bend mirror 9 and the window 14 is replaced by a partial reflection mirror 14a. In such construction, a laser beam from the resonator 6 becomes a filled-in pattern having peaks at both ends thereof as shown in FIG. 49a and, after condensed by a lens 11, a similar pattern is provided as shown in FIG. 49b. Although this pattern has no center peak, the peaks at both sides thereof causes a surface treatment to be non-uniform.

Thus, in the conventional laser machining apparatus, that shown in FIG. 38 can not be used for a uniform machining due to the fact that the higher mode laser beam has the intensity pattern such as shown in FIG. 39 which provides very high power portions at both ends thereof and that shown in FIG. 40 is not suitable to produce an enough power from the laser medium 3 efficiently due to the fact that the small aperture 21 is used to make the laser beam high quality. In the latter case, when the power is increased, the lens 11 may be deformed or damaged in some case since the intensity of beam fallen in the lens becomes very high Further, in the apparatus shown in FIG. 43, it is necessary to use a laser beam 8 whose intensity distribution pattern has very high peaks at both ends thereof. Therefore, the machining itself becomes non-uniform. Further, since the output mirror 4 is heated non-uniformly, the laser output becomes unstable with increase of the output power, resulting in damage of the mirror.

Since, in the composite laser machining apparatus such as shown in FIG. 45 or 46, the resonator 6 must be changed according to the kind of machining, which takes a long time and requires complicated preparation stage. In addition, the area to be machined is limited.

SUMMARY OF THE INVENTION

An object of the present invention is to provide a laser machining apparatus capable of producing a uniform and stable laser beam from a large laser medium to make uniform laser machining possible.

Another object of the present invention is to provide a laser machining apparatus in which a high quality laser beam can be derived from a laser medium with high efficiency and in which there is no damage of a condenser lens even if its power is increased.

A further object of the present invention is to provide a composite laser machining apparatus which can perform various machinings such as cutting, welding and surface treatment of a workpiece without necessity of changing a laser resonator.

A still further object of the present invention is to provide a pulse laser apparatus which can be used in the laser machining.

A laser machining apparatus according to the present invention includes a laser resonator whose enlarging mirror has a partially transmissive center portion and an annular non-reflective portion surrounding the center portion and whose output laser beam is a composition of a laser beam passed through the center portion of the enlarging mirror and an annular laser beam passed through the annular portion thereof. A resultant filled-in, high quality output laser beam is directed directly or through a condensing means to a workpiece.

The laser machining apparatus according to the present invention is capable of performing various machinings such as cutting, welding and surface treatment of the workpiece without changing a construction of the resonator.

BRIEF DESCRIPTION OF THE DRAWING

FIGS. 17a and 17b show condensing characteristics of the embodiment in FIG. 16;

FIG. 18 shows relations between laser output and discharge power of the present invention and the conventional apparatus;

FIG. 19 shows another embodiment according to the second aspect of the present invention;

FIGS. 27a and 27c show other embodiments according to the fourth aspect of the present invention, respectively; in which FIG. 27b shows a waveform of an output laser beam of the embodiment in FIG. 27a;

FIGS. 47a to 47c, 48a to 48c and 49a and 49b show condensing characteristics thereof, respectively.

DETAILED DESCRIPTION OF THE PREFERRED EMBODIMENTS

Since the present invention can use any of laser resonators disclosed in U.S. Pat. application Ser. No. 130,128 filed on Dec. 8, 1987 by the present inventors and entitled "Laser Apparatus", the resonator will be described firstly in brief.

Figure 1:
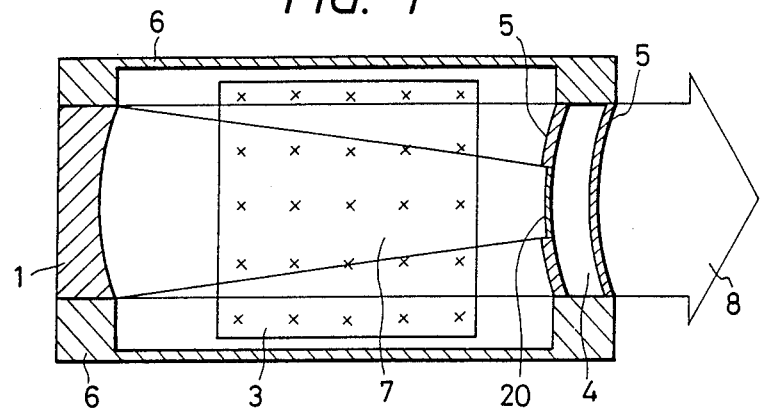
FIG. 1 is a cross section of an embodiment of a laser resonator constituting a main portion of the present invention.

FIG. 1 is a cross section of an example of the laser resonator disclosed in the above mentioned U.S. Application, in which a reference numeral 4 depicts a convex mirror which also functions as a window mirror as well as enlarging mirror and has a center portion in a surface thereof opposing to a collimating mirror 1 on which a partial reflection membrane 20 is formed. A peripheral portion of the surface and the other surface of the convex mirror 4 are coated with non-reflection membranes 5, respectively.

The collimating mirror 1 and the partial reflection membrane 20 of the convex mirror 4 constitute an unstable resonator in which a laser beam 7 reflected and enlarged by the reflection membrane 20 of the convex mirror 4 is amplified by a laser medium 3 and collimated by the collimating mirror 1 to a parallel beam which is derived from the convex mirror 4 as an output laser beam 8. The output laser beam 8 is composed of one portion passed through the partial reflection membrane 20 and the other portion passed through the annular non-reflection membrane 5. Since the one portion has a partial transmital, the output laser beam 8 is filled-in, which corresponds to an infinite value of M defined in the conventional unstable resonator.

Figure 2A:
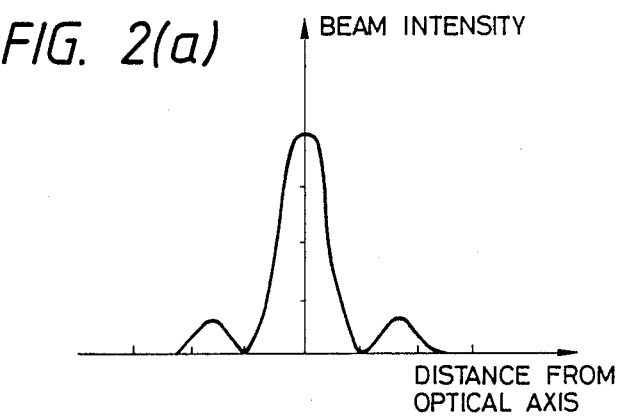
FIGS. 2a and 2b show condensing an characteristics of a conventional laser resonator and the present resonator in FIG. 1, respectively.
Figure 2B:
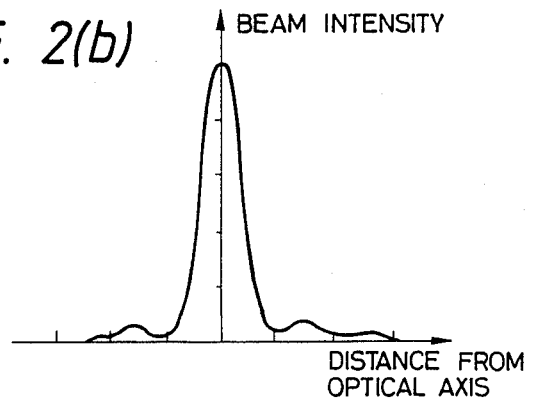

FIG. 2a illustrates a pattern of beam produced by the conventional unstable laser resonator after condensed by a condenser lens and FIG. 2b illustrates that of the present resonator, with distance from an optical axis on abscissa and beam intensity on ordinate.

In obtaining the above illustration, in order to make the oscillation characteristics of the both resonators substantially the same, the reflectivity of the partial reflection membrane 20 is 50% and a ratio of a diameter of the partial reflection membrane 20 to an outer diameter of the laser beam is 1.5, i.e., a partial transmittivity of 50% is given to the enlarging mirror 2 of the conventional unstable resonator having M value of 1.5 to make it a stable resonator.

Further, the radii of curvature of the opposite surfaces of the convex mirror 4 are made equal so that the laser beam 8 is kept in parallel even after passed through the convex mirror 4. It is clear from a comparison of FIGS. 2a and 2b that the laser obtained by the present resonator has a strong peak, i.e., main lobe, at a center thereof, i.e., on its optical axis. It has been confirmed that a power of the main lobe is about 82% of a total laser power. This value corresponds substantially to the theoretical value (80%) of the output power of the conventional unstable resonator having infinite M value. That is, the present resonator can provide the condensation close to the theoretical limit.

Figure 3:
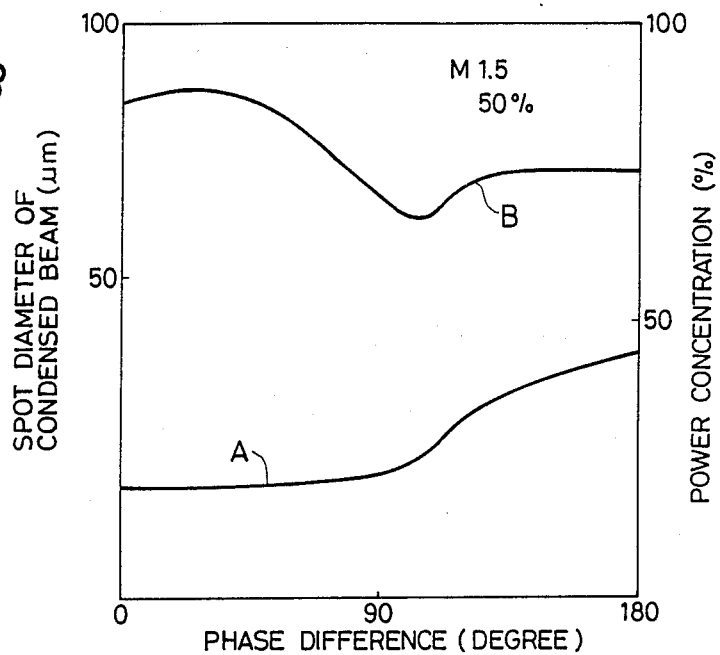
FIG. 3 show relations of the spot diameter of a condensed laser beam and the power concentration in a focus plane to the phase difference between portions of the laser beam.

Further, in the above mentioned case, since a difference in phase variation between the beam portion passing the non-reflection membrane 5 and that passing through the partial reflective membrane 20 is very small, the laser beam 8 is coherent and condensed desirably. However, when the reflectivity of the partial reflective membrane 20 is increased and the thickness thereof is also increased, the phase difference becomes larger, resulting in a degraded condensation. In this regards, a reference is made to FIG. 3 which shows relations of phase difference to a diameter of laser beam at a point at which the beam intensity becomes $1/e^2$ times that on the optical axis, i.e., spot diameter of condensed beam, (curve A), and to a power concentration, i.e., a ratio of power contained in the spot to the total power, (curve B), with phase difference (degree) on abscissa and spot diameter ($\mu$m) and power concentration (%) on ordinate and with M value of 1.5 and partial transmittivity of the enlarging mirror of 50%. It should be noted that the curves A and B in FIG. 3 result from calculations of laser power produced in the resonator and intensity distribution thereof at a condensed spot. It is considered generally that the smaller the spot diameter and the larger the power concentration result in the better the condensation performance. In FIG. 3, however, the power concentration as well as the spot diameter become favorable if the phase difference is within 0° to 45°, while with the phase difference of 100° or more the spot diameter is substantially degraded, resulting in a degraded condensation performance.

Figure 4A:
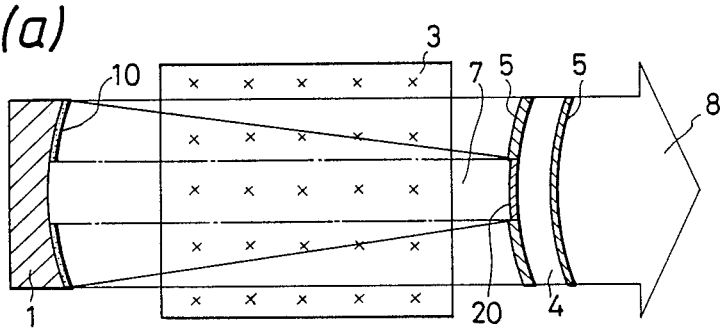
FIGS. 4a, 5a, 6a, 7 and 8 show cross sections of other embodiments of the laser resonator according to the present invention, respectively.
Figure 4B:
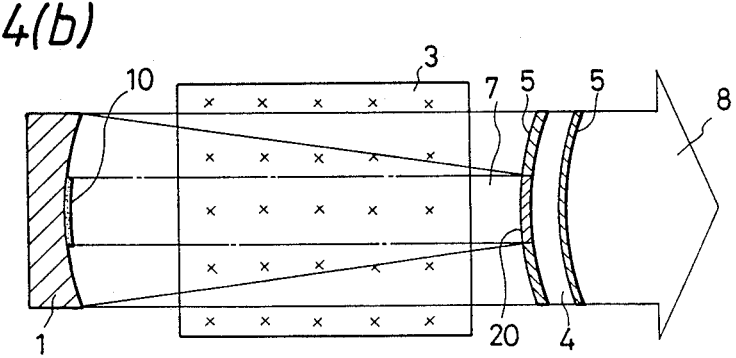

In the latter case, it is enough to provide a reflection thin membrane 10 of metal on the partial reflection membrane 20 or on an annular portion surrounding the latter portion, as shown in FIGS. 4a and 4b to thereby cancel or reduce the phase difference by a thickness of the additional thin membrane 10. The thickness d of the thin metal membrane 10 is given by the following equation:

$$d = |\lambda \cdot \theta / 360| \tag{1}$$

where $\theta$ is a phase advance in degree of beam passing through the partial reflection membrane 20 from that passing through the coating 5 and λ is wavelength of the laser beam.

Figure 5A:
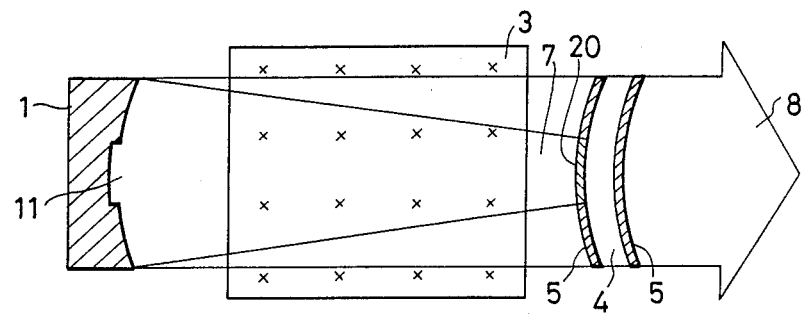
Figure 5B:
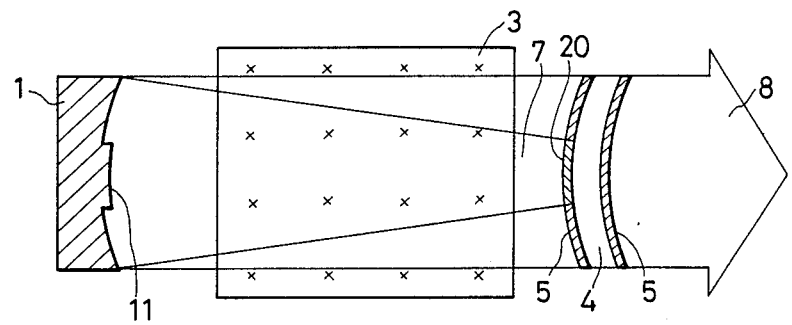
Figure 6A:
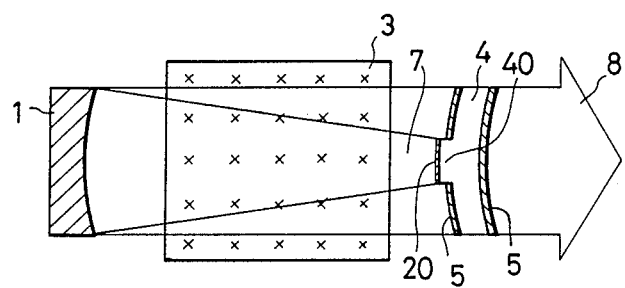
Figure 6B:
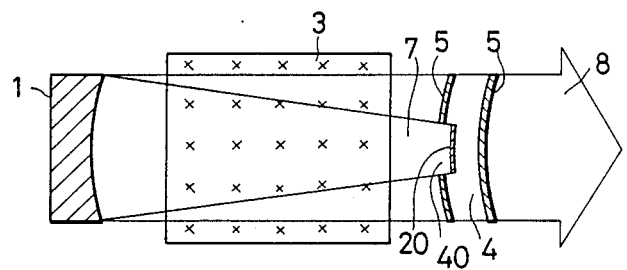

The same effect can be also achieved by providing a stepped portion 11 in the form of a recess or a protrusion on the center portion of the collimating mirror 1, whose diameter is the same as the partial reflection membrane 20, as shown in FIGS. 5a and 5b. Alternatively, a stepped portion 40 in the form of a recess or a protrusion may be provided on the convex mirror 4 as shown in FIGS. 6a and 6b, with the same effect. In either case, the depth or height of the stepped portion is determined by the equation (1).

Figure 7:
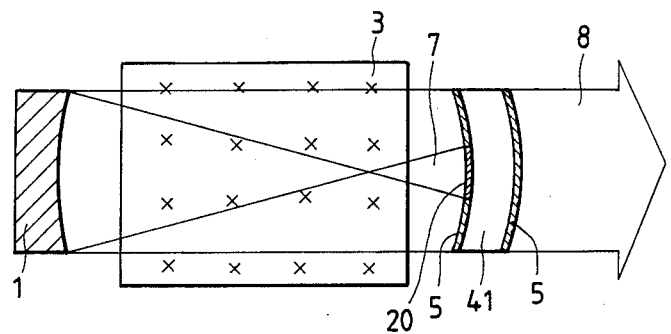

The convex mirror is described as being used in the unstable resonator as the enlarging mirror. Alternatively, in a resonator in which a laser beam is condensed by a concave mirror 41 and then enlarged as shown in FIG. 7, it is possible to produce a laser beam of filled-in mode by providing a partial reflective membrane 20 on a center portion of the concave mirror 41 so that it functions as an enlarging mirror having a partial reflectivity.

It should be noted that in each of the resonators shown in FIGS. 4 to 7 a casing thereof is omitted for clarification of construction. Further, although, in each of them, the enlarging mirror and the window mirror are constructed integrally, it maybe possible to provide an enlarging mirror comprising a concave or convex mirror having a partial reflectivity on a window mirror as in the conventional manner.

Figure 8:
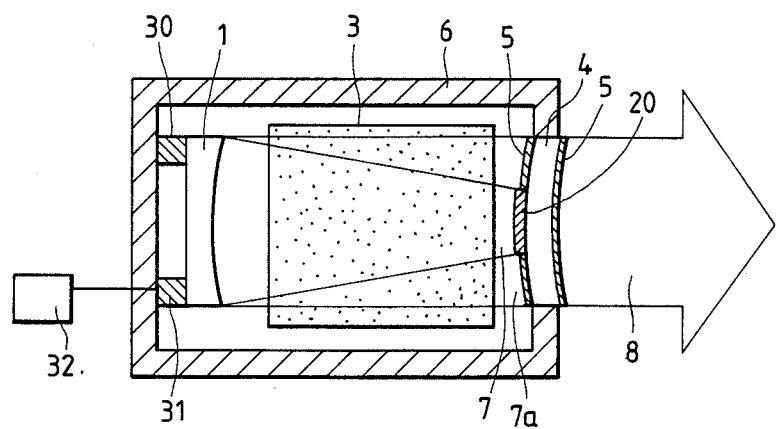

FIG. 8 shows another embodiment of the present laser resonator which is of the pulse type and differs from a conventional pulse type laser resonator such as shown in "Laser Handbook", Ohm Co., 1982, p. 225 in that a convex enlarging mirror 4 is provided in a center portion on an inner surface thereof with a partial reflective membrane 20. A pulsed laser output is obtained by vibrating a collimating mirror 1 supported at one end by a support 30 and at the other end by a piezo element 31 by applying a pulsed voltage from a power source 32 to the latter. The output laser beam has a filled-in intensity distribution pattern as in the preceding embodiments of the present resonator.

Figure 9:
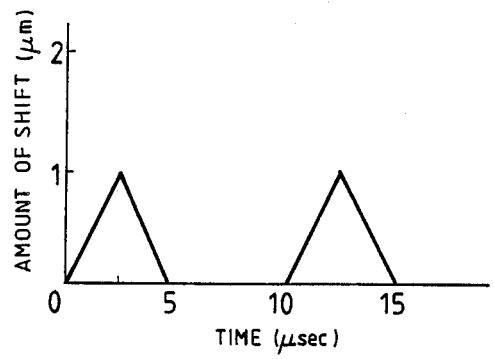
FIGS. 9 and 10 are graphs explaining an operation of the resonator shown in FIG. 8.
Figure 10:
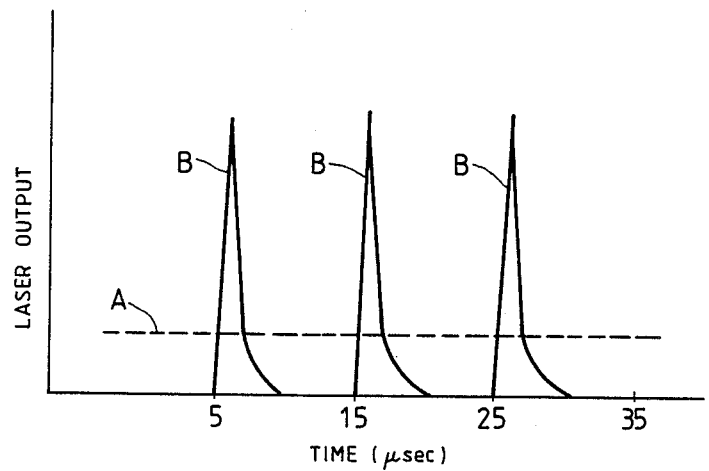

FIG. 9 shows a response characteristics of the piezo element 31 when a length of the resonator containing $CO_2$ as a laser medium 3 is 2.5 m and an enlarging factor of the enlarging mirror 4 is 1.2 and FIG. 10 shows the pulse output of the resonator.

Figure 11:
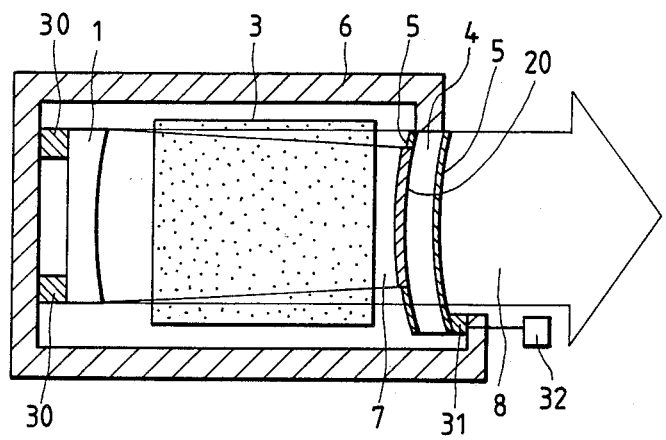
FIG. 11 shows another embodiment of the present laser resonator.

FIG. 11 shows another embodiment of the present resonator in which a collimating mirror 1 is fixedly supported and an enlarging mirror 4 is vibrated by a piezo element 31 energized by a power source 32.

Figure 12:
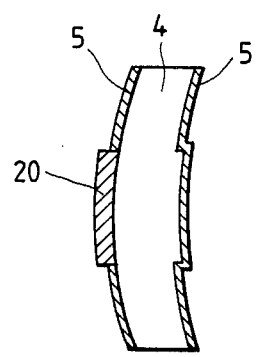
FIG. 12 shows another embodiment of an enlarging mirror of the present invention.

FIG. 12 shows another embodiment of an enlarging mirror 4 which differs from that shown in FIG. 11 in that a center portion of an outer surface of the mirror 4 corresponding to the partial reflection membrane 20 is stepped up to regulate a phase difference between laser beam portions passing through the center portion and the other portion of the mirror by regulating optical path lengths thereof.

Figure 13:
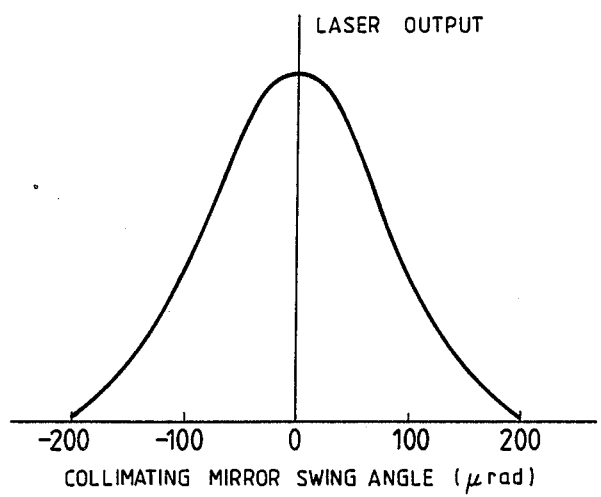
FIG. 13 shows a relation of the laser power to the tilted angle of the resonator mirror obtainable by the resonator in FIG. 11.

A misalignment characteristics with respect to inclination of the mirror of this resonator is shown in FIG. 13. As shown, in order to produce a pulse laser output of the order of 5 K Hz, it is enough to swing the enlarging output mirror by 20 n where the collimating mirror is 200 u rad, i.e., the diameter of the mirror is 100 mm.

Figure 14:
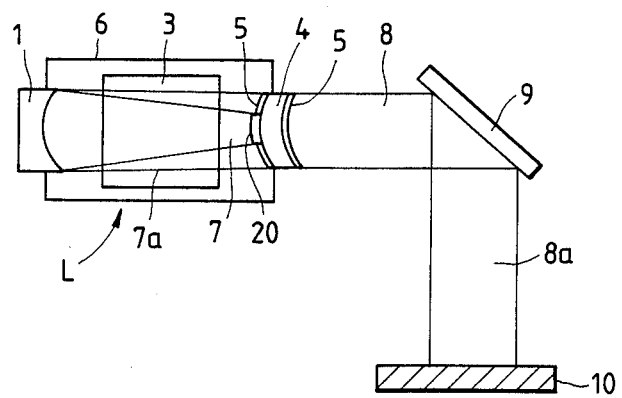
FIG. 14 shows an embodiment of a first aspect of the present invention.

FIG. 14 shows an embodiment of a laser machining apparatus according to a first aspect of the present invention. In FIG. 14, the laser machining apparatus comprises a bend mirror 9 and a laser resonator L having the same construction as that shown in FIG. 11. A reference numeral 10 depicts a workpiece to be machined thereby.

Figure 15A:
FIGS. 15a to 15d show condensing characteristics of the embodiment in FIG. 14.
Figure 15B:
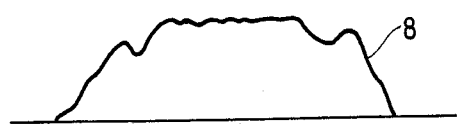

In operation, a laser beam 7 enlarged by a partial reflective membrane 20 on a center portion of a convex mirror 4 is amplified by a laser medium 3 while reciprocating between that and a collimating mirror 1 and returned as a laser beam 7a, and a portion of a center portion of the beam 7a and a portion thereof surrounding the center portion are combined and derived from the resonator L as an output laser beam 8. In this embodiment, the higher mode of the laser beam 7a is prevented from being produced while obtaining a larger cross sectional area of the laser beam by enlargement, resulting in a filled-in lower mode laser beam having a center main lobe produced in the resonator as shown in FIG. 15a. However, since the center portion thereof is reflected partially by the convex mirror 4, the laser beam 8 derived from the resonator L becomes that having a substantially uniform pattern such as shown in FIG. 15b.

Figure 15C:
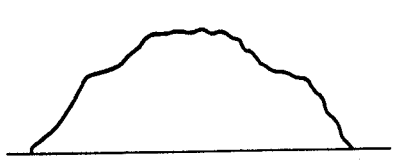

The output laser beam 8 changes its pattern due to diffraction when guided onto the workpiece 10, as shown in FIG. 15c. However, the uniformity of the laser beam is kept unchanged to enable a uniform machining.

Figure 15D:

In the embodiment mentioned above, the phase difference between the laser beam portions passing through the center portion of the convex mirror 4 and the surrounding portion thereof is made zero. It may be possible to regulate the phase difference by changing the thickness of the partial reflective membrane 20 or by providing a step portion on a center portion of the bend mirror 9 so that the configulation of the laser beam on the workpiece can be regulated. FIG. 15d shows a beam pattern on the workpiece when the resonator is constituted such that the beam portion passing through the center portion of the convex mirror 4 is advanced in phase from the beam portion surrounding the center beam by 90°. As is clear from FIG. 15d, the beam width is reduced and a substantially rectangular beam pattern is obtained.

Figure 16:
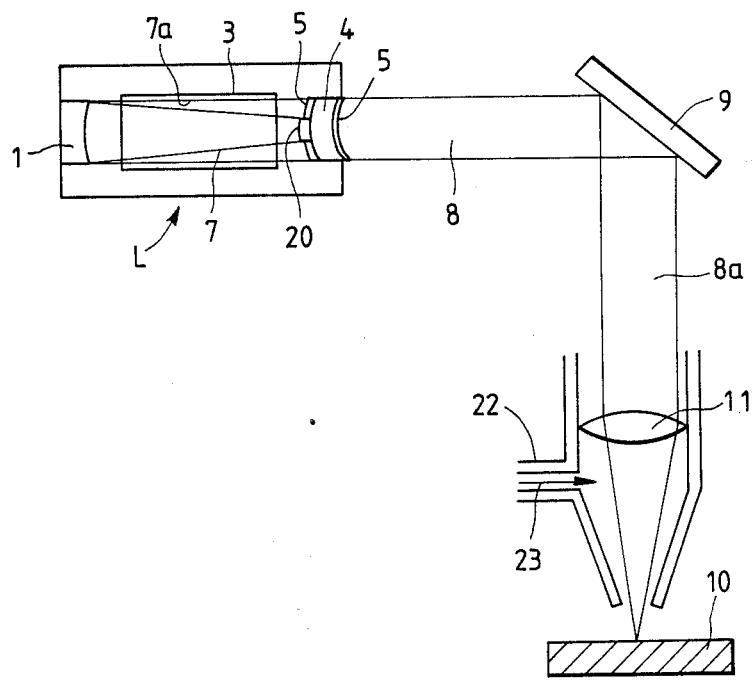
FIG. 16 shows an embodiment according to a second aspect of the present invention.

FIG. 16 shows another embodiment according to a second aspect of the present invention, in which a letter L depicts the laser resonator, 9 a bend mirror, 8a a laser beam bent by the bend mirror 9, 11 a machining lens, 10 a workpiece, 22 a machining gas inlet port and 23 a flow of machining gas.

Figure 39:
FIG. 39 is a condensing characteristics of the conventional laser apparatus.
Figure 40:
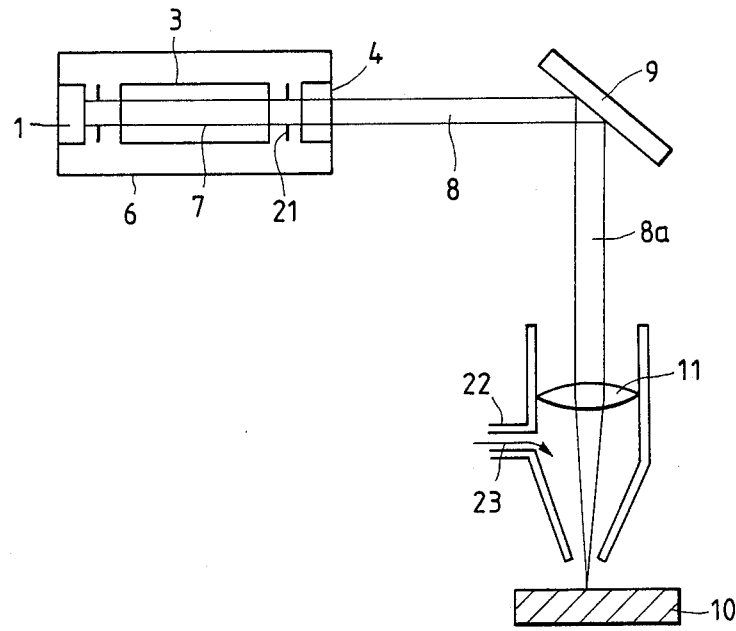
FIG. 40 shows a conventional laser machining apparatus.

In operation, a laser beam 7 enlarged and partially reflected by a partial reflective membrane 20 on a convex mirror 4 is collimated to a parallel beam and reflected by a collimating mirror 1 as a beam 7a. A center portion of the beam 7a is derived partially from the output mirror 4 and combined with an annular portion thereof surrounding the center portion passed without reflection, resulting in an output laser beam 8. The quality of this beam 8 may be substantially the same as that obtained by the conventional resonator such as shown in FIG. 39 with the aperture 21 being very small and a diameter of the beam is increased.

Figure 41A:
FIGS. 41a to 41c are condensing characteristics thereof.
Figure 41B:
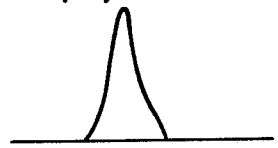
Figure 41C:
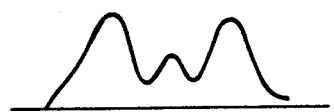
Figure 42:
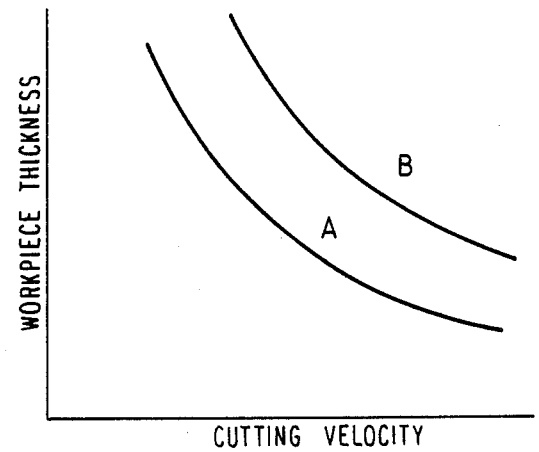
FIG. 42 is a graph showing a relation between a cutting speed and a thickness of a workpiece to be cut.
Figure 43:
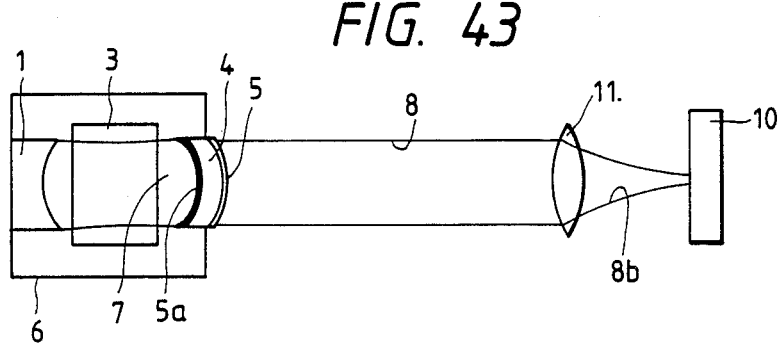
FIG. 43 shows another conventional laser machining apparatus.
Figure 44A:
FIGS. 44a and 44b show condensing characteristics thereof.
Figure 44B:
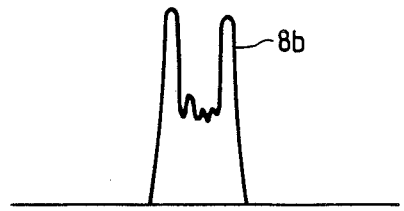
Figure 45:
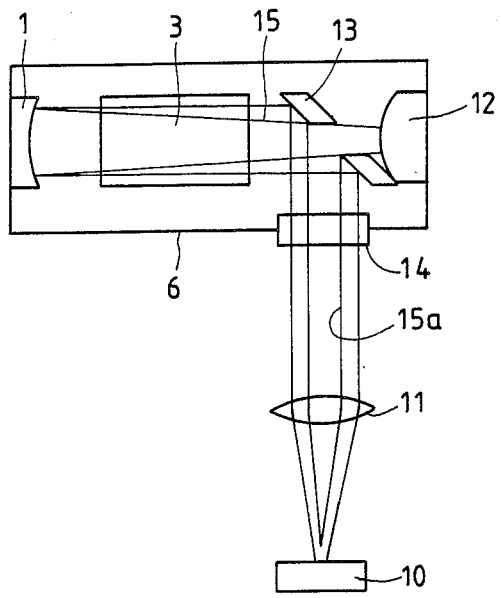
FIGS. 45 and 46 show other conventional laser machining apparata, respectively.
Figure 46:
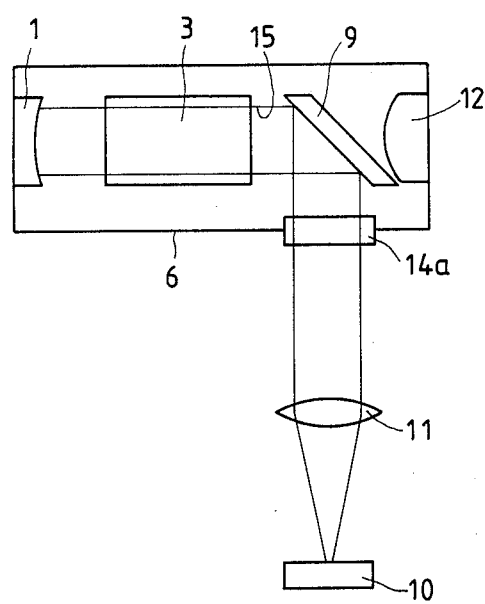
Figure 47A:
Figure 47B:
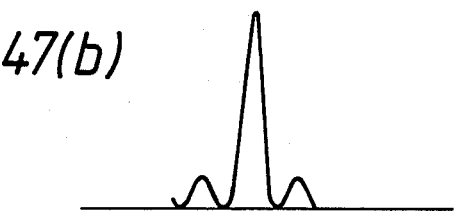
Figure 48A:
Figure 48B:
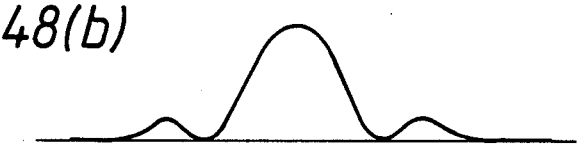
Figure 48C:
Figure 49A:
Figure 49B:
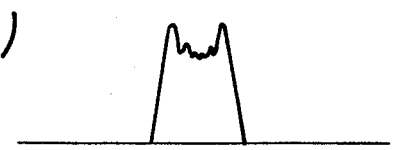

Since the center portion of the laser beam 7a passes partially through the convex mirror 4, the laser pattern of the beam 8 has a main lobe lower than that of Gaussian pattern. FIG. 7a shows a configulation of laser beam produced by a discharge excited CO gas laser having the same resonator length, i.e., distance between mirrors of the resonator, as that of the conventional resonator, in which the enlarging factor of the resonator is 2, an outer diameter of the partial reflective membrane 20 is 20 mm and the transmittivity is 50%. This beam pattern which is obtained at an upper surface of the lens is broad and about 2.5 times that shown in FIG. 41a in intensity. The laser beam can be condensed by the lens 11 to a pattern having a sharp main lobe as shown in FIG. 17b exhibiting a high quality laser beam.

FIG. 18 shows oscillation characteristics curves obtained by using the same laser medium, in which a curve B corresponds to the conventional one and a curve A is the oscillation characteristics of the present invention. From FIG. 18, it is clear that the oscillation efficiency in the present invention is much superior to that of the conventional characteristics.

It is known that, in order to realize a high precision cutting of metal workpiece, a circular polarization of laser beam is inevitable. FIG. 19 shows an embodiment of the present invention in which a laser beam is linealy polarized in a resonator by a linear polarization element 17 comprising a folded mirror provided in the resonator and then circular-polarized by a circular polarization element 18 comprising a retarder mirror provided outside the resonator.

Figure 20:
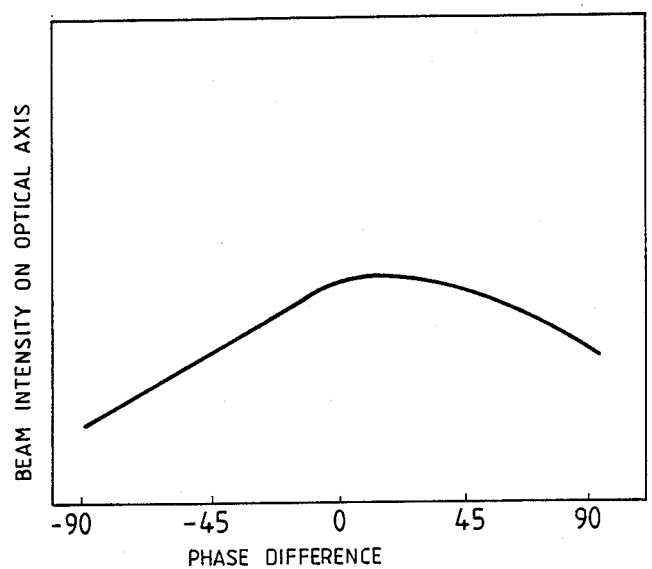
FIG. 20 shows relation between the phase difference and the intensity on the optical axes thereof according to the embodiment in FIG. 19.
Figure 21A:
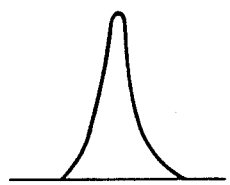
FIGS. 21a and 21b show condensing characteristics thereof.
Figure 21B:
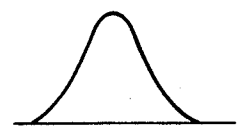

As mentioned previously, it is possible to regulate a condensed laser beam pattern by regulating the phase difference between the laser beam portion passing through the partial reflective membrane 20 of the convex mirror 4 and that passing through the surrounding portion thereof. FIG. 20 is a graph showing a relation of a phase difference between the beam portion passing through the annular surrounding portion of the convex mirror 4 and that passing through the center portion thereof to an intensity of the condensed laser beam at the optical axis thereof, FIG. 21a illustrates the condensed laser beam pattern when the phase difference is cancelled out and FIG. 21b illustrates the beam pattern when the phase difference exists. As is clear from these figures, the larger the phase difference provides the lower the beam intensity and the broader the pattern. For the clearance welding, the pattern such as shown in FIG. 21b is preferrable while, for the cutting, the pattern such as shown in FIG. 21a is preferrable. The regulation of the phase difference can be performed by merely differentiating optical length of these two beams by, for example, regulating the thickness of the partial reflective membrane, as mentioned previously.

Figure 22:
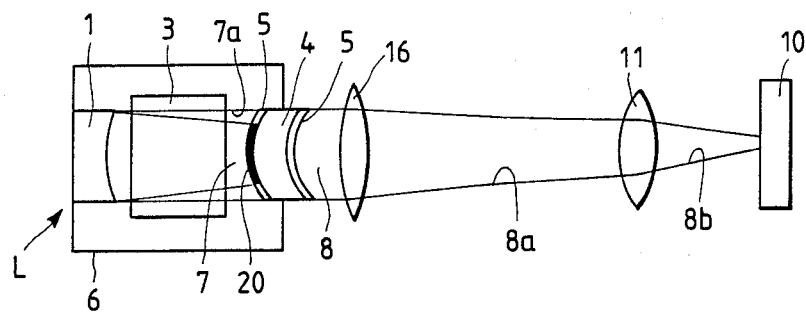
FIG. 22 shows an embodiment according to a third aspect of the present invention.

FIG. 22 shows an embodiment according to a third aspect of the present invention. A laser resonator to be used in this embodiment is the same as that used in the embodiment according to the first aspect of the present inventiuon shown in FIG. 14. In FIG. 22, a reference numeral 16 depicts a condenser lens, 11 a machining lens and 10 a workpiece.

In FIG. 22, a laser beam 7 partially reflected by a partial reflective membrane 20 provided on a center portion of an inner surface of a convex mirror 4 is enlarged thereby, reflected and collimated by a full reflection mirror 1 and amplified by a laser medium 3 while reciprocating in a resonator. A center portion of a laser beam 7a collimated by the full reflection mirror 1 passes through the partial reflective membrane 20 partially and an annular portion thereof surrounding the center portion passes through a non-reflection membrane 5 without loss. These beam portions are combined and derived from the resonator as an output laser beam 8 having a filled-in pattern exhibiting a uniform intensity distribution. The beam 8 is condensed by the condenser lens 16 to a position in the vicinity of the machining lens 11 as a laser beam 8a and then further condensed by the machining lens 11 as a final laser beam 8b for machining the workpiece 10.

Figure 23A:
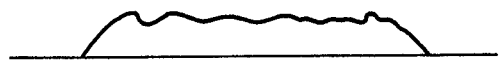
FIGS. 23a to 23c show condensing characteristics thereof.
Figure 23B:
Figure 23C:
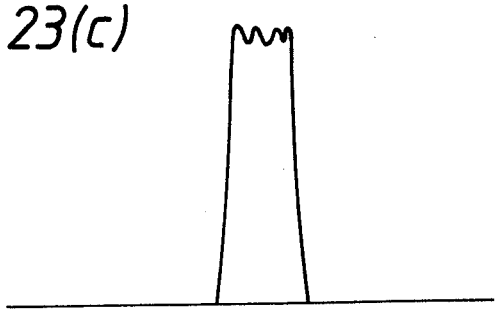

FIG. 23a shows an example of an intensity distribution of the laser beam 8 when the latter is derived from a resonator of a $CO_2$ laser machining apparatus, in which radius of curvature of the convex mirror 4 is —5 m, radius of curvature of the full reflection mirror 1 is 7.5 m, a distance between the mirrors 1 and 4 is 1.25 m, the reflectivity of the center portion of the convex mirror 4 is 50% and an outer diameter of the beam 8 is 20 mm. Since the laser beam 8 is filled-in, its intensity distribution becomes Gaussian type such as shown in FIG. 23b when it is condensed by the condenser lens 16 having focal length of 10 m. The condensed laser beam 8a is further condensed by the machining lens 11 resulting in a laser beam 8b of high power concentration having a pattern which is the same as that immediately after the output mirror 4 while reduced in width, such as shown in FIG. 23c.

Assuming the focal lengths of the condenser lens 16 and the machining lens 11 as $f_1$ and $f_2$, respectively, and when the machining lens 11 is put on a focal point of the condenser lens 16, a beam intensity distribution pattern similar to that obtainable immediately after the output mirror 4 is obtained on the surface of the workpiece 10 which is remote from the machining lens 11 by Z where Z satisfies the following equation:

$$1/Z = 1/f_2 - 1/f_1$$

Since $f_2 << f_1$, generally, Z is substantially equal to $f_2$ and thus the intensity distribution immediately after the convex mirror 4 is obtained at a point substantially equal to the focal point of the machining lens 11.

Figure 24:
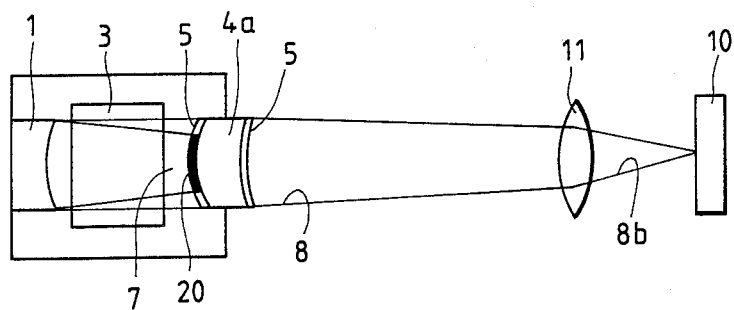
FIGS. 24 and 25 are other embodiments according to the third aspect of the present invention, respectively.
Figure 25:
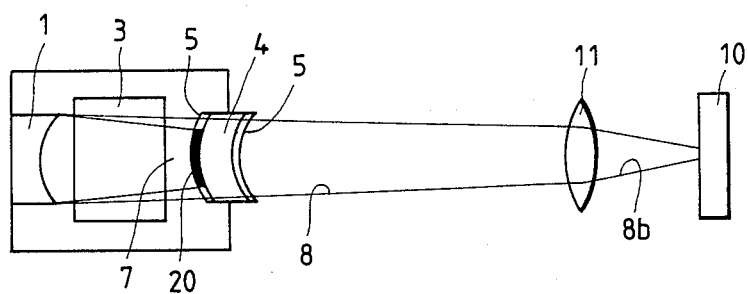

The machining lens 11 may be substituted by a spherical reflection mirror. Further, instead of the condenser lens 16, it may be possible to render the convex mirror 4 to function as the condenser lens. That is, a convex mirror 4a having an inner and an outer surfaces whose radii of curvature are different can be used as shown in FIG. 24. Alternatively, it may be possible to produce a laser beam 8 by using a smaller radius of curvature of the full reflection mirror 1, as shown in FIG. 25.

Figure 26A:
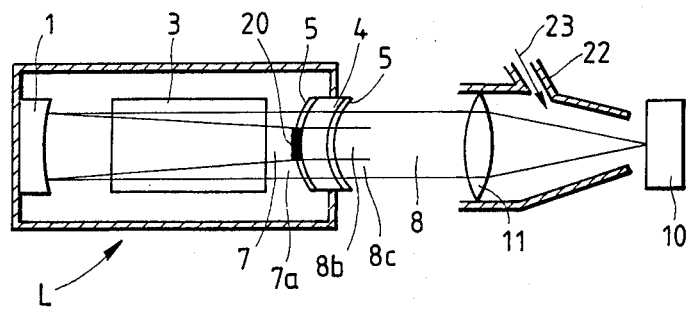
FIGS. 26a and 26c show embodiments according to a fourth aspect of the present invention, respectively.
Figure 26B:
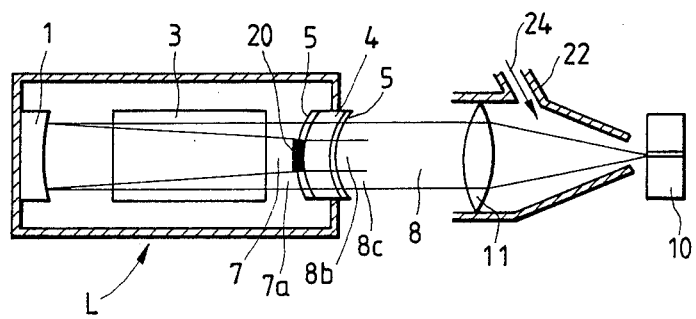
Figure 26C:
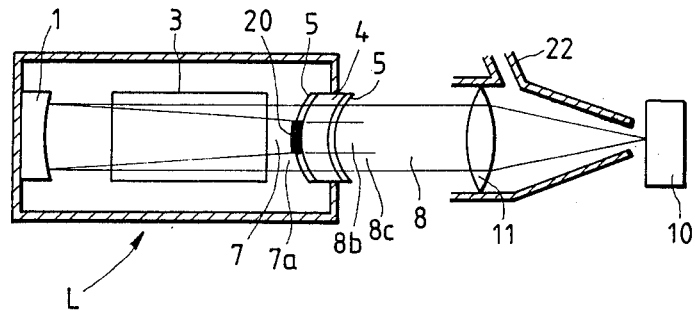

FIGS. 26a to 26c show another embodiment according to a fourth aspect of the present invention. In these figures, a letter L depicts a laser resonator, 7 a laser beam enlarged and reflected by a partial reflective membrane 20, 7a a parallel laser beam obtained by reflecting and collimating the laser beam 7 by a full reflection collimating mirror 1, 8b a laser beam which is a portion of the laser beam 7a passed through the partial reflective membrane 20 on an inner surface of a convex mirror 4, 8c a laser beam which is the other portion of the laser beam 7a passed through a non-reflection membrane 5 on the inner surface of the convex mirror 4 and 8 an output laser which is a combination of the laser beams 8b and 8c. A reference numeral 11 depicts a condenser lens, 10 a workpiece, 22 a gas inlet port, 23 an assist gas such as oxygen introduced through the gas inlet port 22 into a nozzle for assisting a machining such as cutting and 24 a machining gas such as argon for welding.

In FIGS. 26a to 26b, the convex mirror 4 and the full reflection mirror 1 constitute the laser resonator L which is one of unstable type. The laser beam 7 enlarged and reflected by the partial reflection membrane 20 on the inner surface of the convex mirror 4 is reflected by the full reflection collimating mirror 1 and amplified by a laser medium 3 while reciprocating therebetween, resulting in the parallel beam 7a. A center portion of the laser beam 7a passes through the partial reflection membrane 20 an derived as the laser beam 8b. The other portion of the laser beam 7a passes through the non-reflection membrane 5 and is derived as the laser beam 8c. The beam portions 8b and 8c are combined to provide the output laser beam 8.

The laser beam 8 is coherent and has an intenity distribution pattern of filled-in type. Therefore, when condensed by the condenser lens 11, the intensity distribution pattern becomes Gaussian type having no side peak which is used to machine the workpiece 10.

FIGS. 26a, 26b and 26c show an embodiment according to the fourth aspect of the present invention, illustrating an operation thereof. In these figures, L depicts a laser resonator, 7 a laser beam enlarged and partially reflected by a partial reflection membrane 20, 7a a parallel beam obtained by reflecting the laser beam 7 by means of a full reflection collimating mirror 1, 8b a laser beam passed through the partial reflection mirror 20 on a convex mirror 4, 8c a laser beam passed through a non-reflection membrane 5 on the inner surface of the convex mirror 4 and 8 a composite laser beam of the beams 8b and 8c. 11 depicts a condenser lens, 10 a workpiece, 22 a gas guide port, 23 a cutting assist gas such as oxygen introduced through the gas inlet port 22 to a nozzle and 24 a welding gas such as argon.

The convex mirror 4 and the full reflection collimating mirror 1 constitute a kind of unstable resonator. The laser beam 7 reciprocates within the resonator while it is amplified by a laser medium 3 and converted into the parallel beam 7a the center portion 8b of which is derived through the partial reflection membrane 20 as one component of the output laser beam 8 and the peripheral portion 8c of which is derived as the other component of the output laser beam 8.

The output laser beam 8 which is a composition of the laser beams 8b and 8c is coherent and filled-in. Therefore, the beam pattern thereof, when condensed by the condenser lens 11, becomes Gaussian type having no side peak and is suitable to machine the workpiece 10.

Figure 27A:
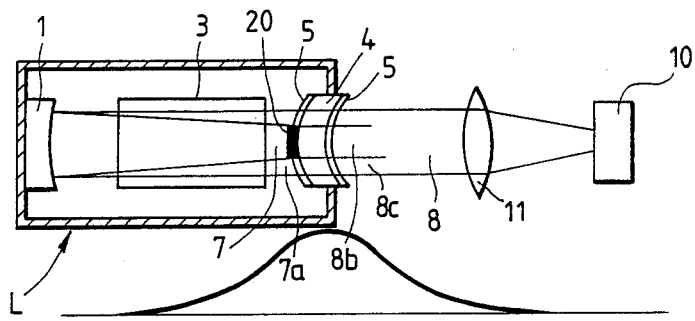
Figure 27B:
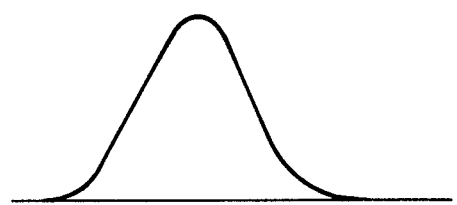
Figure 27C:
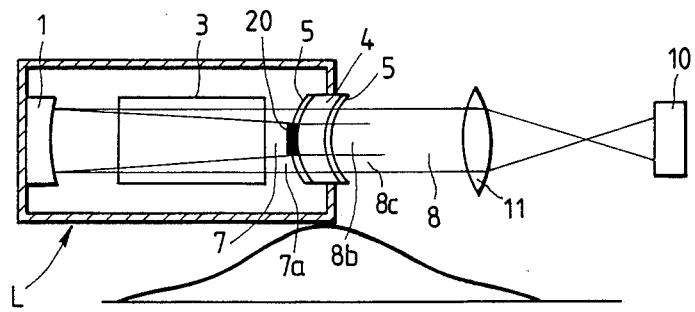

FIGS. 27a to 27c show the intensity distribution patterns of the laser beam 8 having an outer diameter of 20 mm and condensed by the condenser lens 11 having focal length 400 mm, taken at a point remote from the focal point of the lens 11 by 20 mm on the resonator side, at the focal point and at a point remote from the focal point by 20 mm on the opposite side thereof, respectively. As is clear from these figures, the intensity distribution patterns obtained on the both sides of the condenser lens 11 are substantially the same. Therefore, an effective cutting can be performed by using this beam with an aid of the machining gas 23 such as oxygen as shown in FIG. 26a or an effective welding can be performed by this beam with an aid of the machining gas 24 such as argon as shown in FIG. 26b. In the case shown in FIG. 26c in which no assist gas is supplied, a surface treatment of the workpiece 10 can be performed effectively.

Figure 28A:
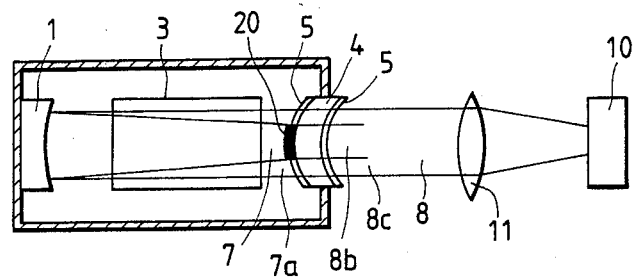
FIGS. 28a and 28b and 29a and 29b show other embodiments according to the fourth aspect of the present invention, respectively.
Figure 28B:
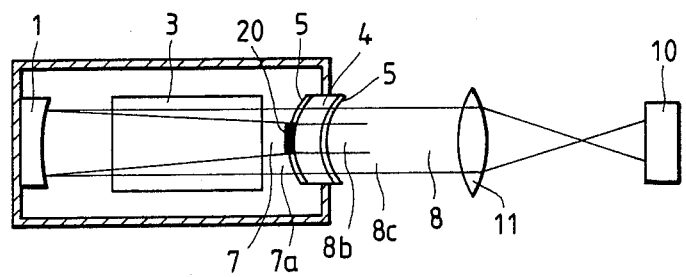
Figure 29A:
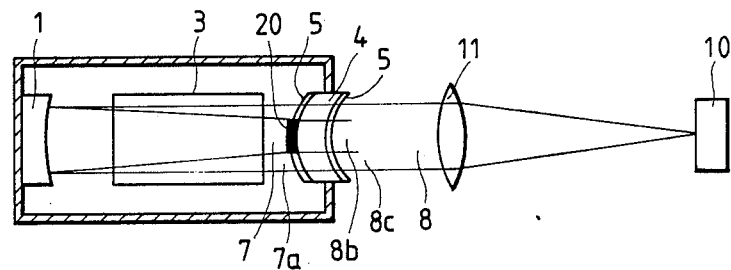
Figure 29B:
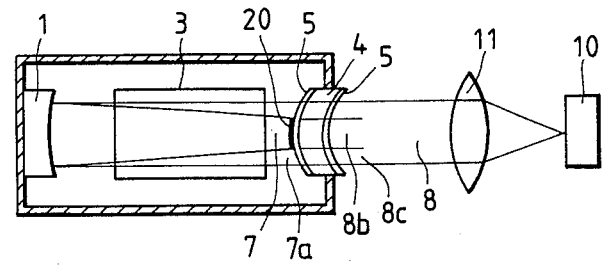

In the case of surface treatment of the workpiece which does not require a high power concentration, it is possible to move the workpiece relatively in an off-focus plane orthogonal to the laser beam as shown in FIGS. 28a or 28b, or it is possible to regulate the power concentration on the workpiece 10 by changing the focal length of the condenser lens 11 as shown in FIGS. 29a and 29b.

Figure 30:
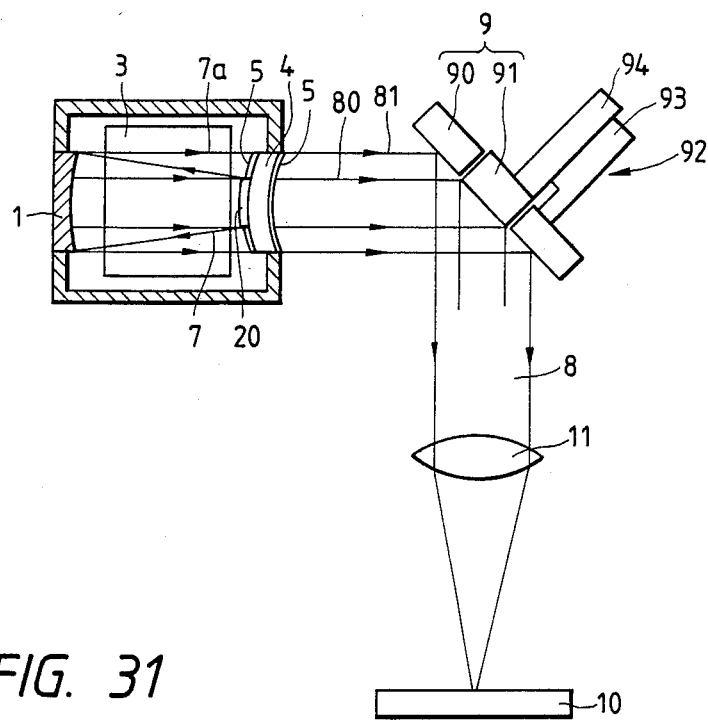
FIGS. 30 to 33 show other embodiments of the present apparatus, respectively.

FIG. 30 shows another embodiment of the phase regulating mechanism. In FIG. 30, a bend mirror 9 is disposed in an optical path from a laser resonator having substantially the same construction as that shown in FIG. 16. The bend mirror 9 is composed of a stationary annular full reflection mirror portion 90 and a movable full reflection mirror portion 91 arranged in a center opening of the annular mirror portion 90. The movable mirror portion 91 has a movable portion 94 which is supported by a beam 93 slidably therealong. The movable portion 94 and the beam 93 constitute a linear movement mechanism 92.

In operation, a laser beam portion 80 passed through a partial reflection membrane 20 on an enlarging mirror 4 is received by the movable mirror 91 and a laser beam portion 81 passed through a non-reflection membrane 5 is received by the stationary mirror portion 91. Assuming that a phase of the laser beam portion 81 leads from the laser beam portion 80 by δ, the movable portion 94 is moved along the beam 93 forwardly so that an optical path length of the laser beam portion 81 becomes longer than that of the laser beam portion 80 by l which is defined by the following equation:

$$l = \lambda \cdot \delta / 2\pi$$

where λ is wavelength of the laser beam. When an incident angle of he laser beam to the bend mirror 9 is 45°, an amount d of the forward movement of the movable mirror 91 can be determined as follow:

$$d = l / \sin 45°$$

In the opposite case, the movable mirror 91 is moved rearwardly.

A resultant coherent laser beam 8 is condensed by a condenser lens 11 and directed to a workpiece 10 as mentioned previously.

Figure 31:
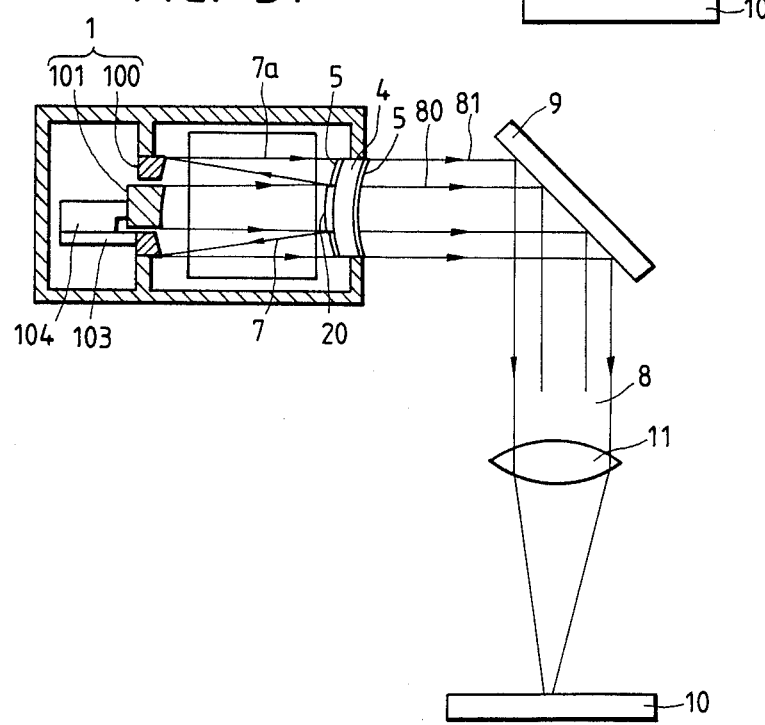

FIG. 31 shows another embodiment in which the phase regulator is incorporated in a laser resonator. In FIG. 31, a center portion 100 of a full reflection mirror 1 is made movable with respect to a surrounding portion 101 thereof by a linear movement mechanism similar to that shown in FIG. 30. That is, a beam 103 extends rearwardly from the surrounding portion 101 and a movable portion 104 formed integrally with the center portion 101 is supported by the beam 103 slidably therealong. The effect of this embodiment is the same as that obtained by the embodiment in FIG. 30.

Figure 32:
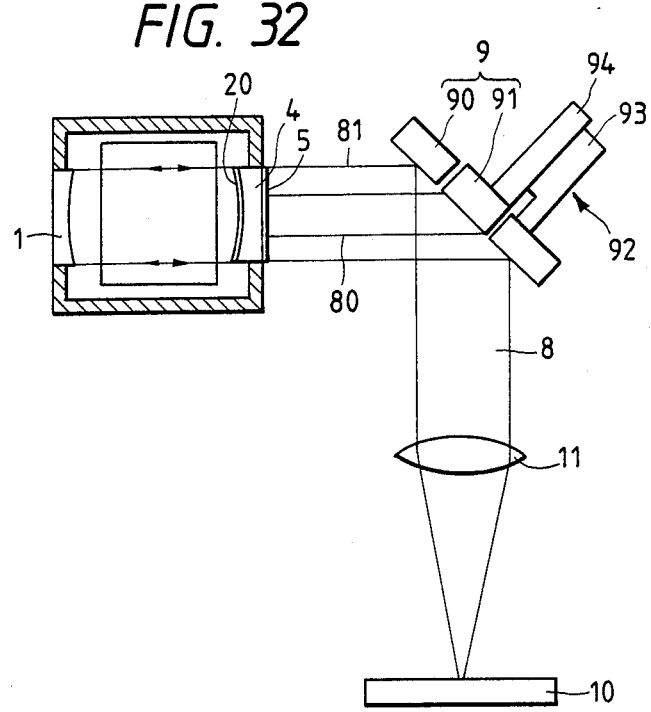
Figure 33:
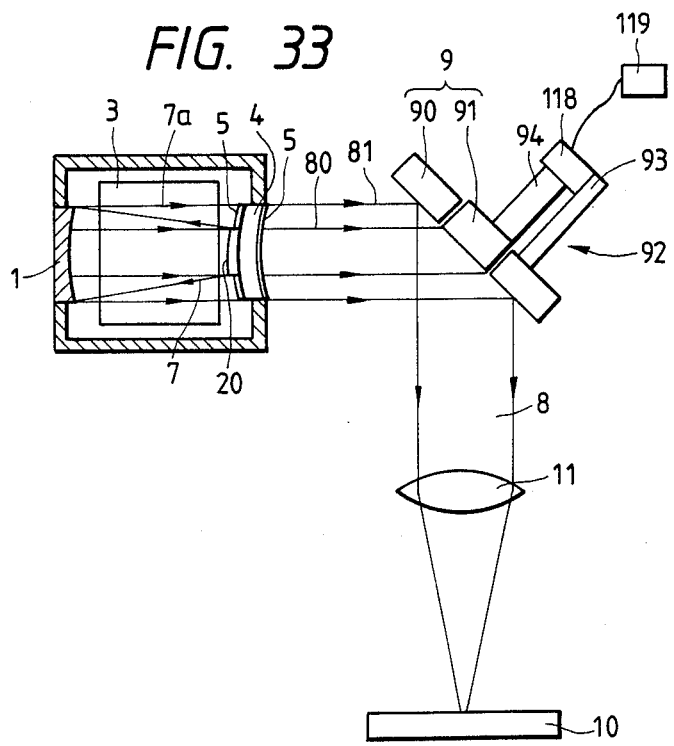

FIG. 32 shows another embodiment of the present invention which differs from the embodiment in FIG. 30 in that a resonator is of stable type and FIG. 33 shows another embodiment which is similar to that shown in FIG. 30 except that the linear movement mechanism is controlled by, for example, a piezo element 118 energized by a power source 119.

Figure 34A:
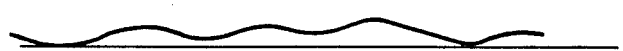
FIGS. 34 to 37 show various characteristics of the embodiments in FIGS. 30 to 33.
Figure 34B:
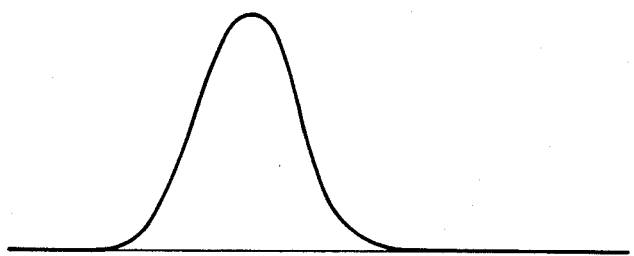

In FIG. 33, a movable mirror portion 91 is supported by the piezo element 118 which in turn is supported by a beam 93 extending from a stationary mirror portion 90 such that, when an a.c. voltage is supplied from the power source 119 to the piezo element 118, the movable mirror portion 91 is moved back and forth. Thus, a periodic change of relative optical path length of a center beam portion 80 to a surrounding beam portion 81 and hence a periodic change of phase difference therebetween is produced. FIG. 34a shows an intensity distribution pattern of a laser beam obtained by condensing a resultant laser beam 8 by a condenser lens 11 when the laser beam portion 81 is delayed from the beam portion 80 by 180° and FIG. 34b shows that when there is no phase difference therebetween. As is clear from FIGS. 34a and 34b, the pattern can be changed substantially by periodically changing the phase difference from −180° to 0°, so that it becomes possible to perform a pulsed machining by this embodiment.

The amount d of linear movement of the movable mirror portion 91 necessary to realize the range of phase difference from −180° to 0° is determined under the same conditions as those in the embodiment in FIG. 30 as follows:

$$d = \lambda \times (180°/360°) \times \sin 45° = 0.35\lambda$$

For a $CO_2$ laser, for example, $\lambda = 10.6$ μm. Therefore, d=3.7 μm which is realizable by the piezo element 118. This means that, according to this embodiment, it becomes possible to perform a pulsed machining as high repetition rate as several hundreds KHz which is impossible to realize with a usual $CO_2$ laser oscillator.

Figure 35:
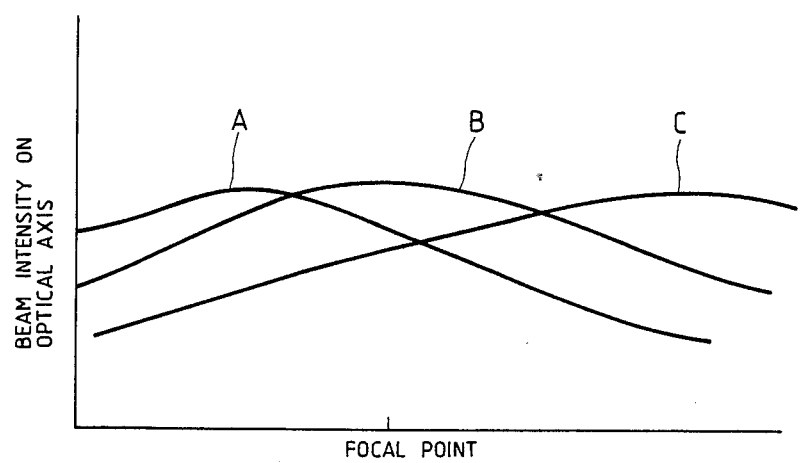
Figure 36:
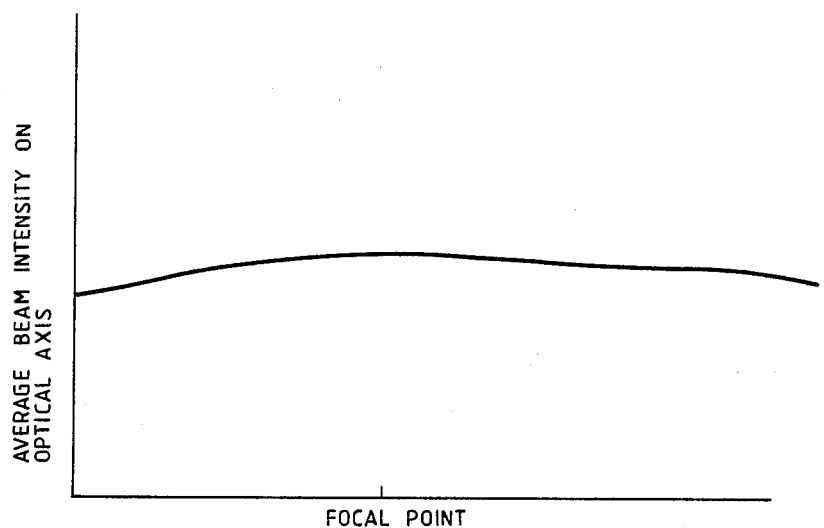

Curves A, B and C in FIG. 35 show a beam intensity at around a focal point of the condenser lens 11 on an optical axis when the phase difference between the beam portions 80 and 81 is −60°, 0° and +60°, respectively, and FIG. 36 shows an average intensity on the optical axis when the phase difference is controlled such that it is changed from +60° to −60° periodically. As is clear from FIGS. 35 and 36, a laser beam whose intensity around the focal point on the optical axis is not changed substantially, i.e., a laser beam having a very large focus range, is obtained by performing the periodic phase control, which is usable in cutting a thick workpiece or for a deep welding.

Figure 37:
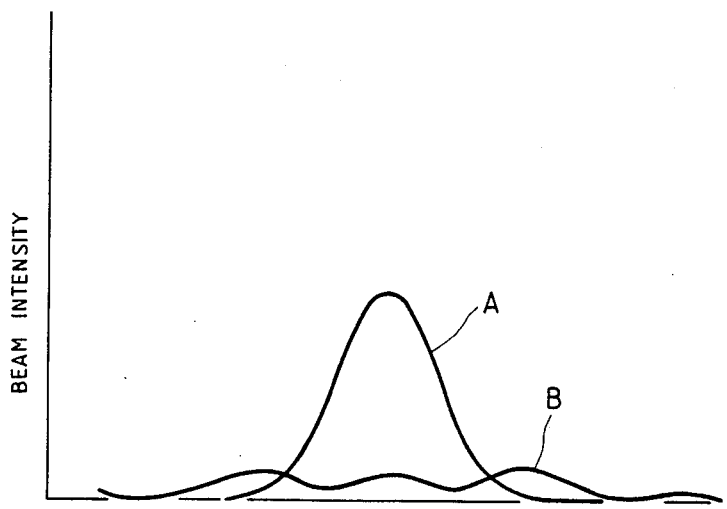
Figure 38:
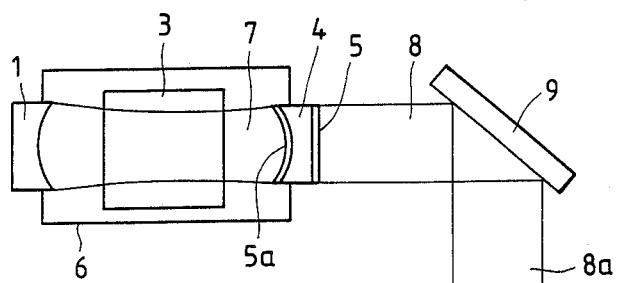
FIG. 38 shows the conventional laser apparatus.

FIG. 37 shows characteristics curves A and B in which curve A shows an intensity distribution pattern of a condensed laser beam obtained by condensing a laser beam having a Gaussian distribution produced by a stable laser resonator such as shown in FIG. 32 and curve B shows that when a central portion of the Gaussian beam having a half of an outer diameter of the Gaussian beam is given a phase difference of 180° with respect to the other. In this case, it is also possible to realize a pulsed machining by changing the phase difference periodically since the intensity on the optical axis is substantially changed thereby.

As described hereinbefore, according to the first aspect of the present invention, it is possible to derive a laser beam having a uniform large cross sectional area, i.e., uniform high power laser beam from a large volume laser medium, so that a uniform and high speed laser machinig is realized.

According to the second aspect of the present invention, a laser beam having a uniform intensity distribution pattern is obtained in a laser resonator which makes a uniform machining possible. Further, since the laser beam passed through the output mirror is also uniform, the laser beam can be obtained stably in a wide power range, resulting in an efficient high quality machining.

According to the third aspect of the present invention, it is possible to obtain a high quality laser beam having a large cross sectional area and a broad intensity distribution pattern. Since such beam can be derived from the resonator effeciently. Further, since it is possible to increase the power without damages of the condenser lens, an efficient high speed machining can be realized.

Further, according to the fourth aspect of the present invention, a filled-in, coherent laser beam is obtained which makes various machinings such as cutting, welding and surface treatment of a workpiece possible without changing a resonator.

When the phase regulation is performed by making the optical path length of either of the laser portion passing through the partial reflective membrane of the enlaging or output mirror or the laser portion passing through the non-reflection membrane thereof different from the other by means of the linear movement mechanism, it is possible to respond to a phase variation of the laser beam due to temperature variation of the output or enlarging mirror, resulting in a precise phase control. Further, since the beam intensity distribution pattern on the optical axis can be substantially changed by changing the phase difference, it is possible to perform a pulse machining at high repetition rate. In addition, by a periodic phase control, it is possible to obtain a laser beam having a large focus range.

What is claimed is:

1. A laser machining apparatus comprising:
    a laser resonator including a convex or concave enlarging mirror having a partially transmissive central portion;
    a collimating mirror arranged in opposing relation to said enlarging mirror for reflecting a laser beam, reflected by said enlarging mirror while being enlarged, back to said enlarging mirror; and
    a bend mirror for bending an output laser beam composed of a first laser beam portion passed through said central portion of said enlarging mirror and a second laser beam portion passed through the other non-reflecting portion of said enlarging mirror to a workpiece.

2. The laser machining apparatus as claimed in claim 1, further comprising means for regulating a difference in phase between said first and said second laser beam portions to obtain a suitable intensity distribution pattern of said output laser beam to an intended laser machining.

3. The laser machining apparatus as claimed in claim 2, where said means comprises a portion of said enlarging mirror having a thickness different from that of the other portion thereof.

4. The laser machining apparatus as claimed in claim 2, wherein said means comprises a portion of said collimating mirror which stepped with respect to the other portion thereof 5. The laser machining apparatus as claimed in claim 2, wherein said means comprises a portion of said bend mirror stepped with respect to the other portion thereof.

6. The laser machining apparatus as claimed in claim 3, wherein said stepped portion of said collimating mirror is movable with respect to said the other portion thereof.

7. The laser machining apparatus as claimed in any of claims 1 to 6, wherein said collimating mirror is supported by a member having a length which varies periodically according to an external control.

8. The laser machining apparatus as claimed in any of claims 1 to 6, wherein said bend mirror is supported by a member having a length which varies periodically according to an external control.

9. The laser machining apparatus as claimed in any of claims 1 to 6, wherein the ratio of the diameter of the central portion to the outer diameter and the reflectivity of the enlarging mirror are such that said laser resonator is of a stable type.

10. The laser machining apparatus as claimed in any of claims 1 to 6, wherein said laser resonator is of unstable type.

11. A laser machining apparatus comprising:
an unstable laser resonator including a convex or concave enlarging mirror having a partially transmissive central portion;
a collimating mirror arranged in opposing relation to said enlarging mirror for reflecting a laser beam, reflected by said enlarging mirror while being enlarged, back to said enlarging mirror, for obtaining an output laser beam composed of a first laser beam portion passed through said central portion of said enlarging mirror and a second laser beam portion passed through the other non-reflecting portion of said enlarging mirror; and
condenser means for condensing said output laser beam.

12. The laser machining apparatus as claimed in claim 11, further comprising means for regulating a difference in phase between said first and said second laser beam portions to obtain a suitable intensity distribution pattern of said laser beam to an intended laser machining.

13. The laser machining apparatus as claimed in claim 11 or 12, wherein said laser beam is circular-polarized.

14. A laser machining apparatus comprising:
an unstable laser resonator including a convex of concave enlarging mirror having a partially transmissive central portion;
a collimating mirror arranged in opposing relation to said enlarging mirror for reflecting a laser beam, reflected by said enlarging mirror while being enlarged, back to said enlarging mirror, for obtaining an output laser beam composed of a first laser beam portion passed through said central portion of said enlarging mirror and a second laser beam portion passed through the other non-reflecting portion of said enlarging mirror;
a machining lens arranged in the vicinity of said workpiece; and
a condenser means for condensing said laser beam in the vicinity of said machining lens.

15. The laser machining apparatus as claimed in claim 14, wherein said condenser means comprises a condenser element disposed outside said enlarging mirror.

16. The laser machining apparatus as claimed in claim 14, wherein said enlarging mirror has inner and outer surfaces, said inner and outer surfaces having different radii of curvature.

17. The laser machining apparatus as claimed in claim 14, wherein said collimating mirror has a smaller radius of curvature than the curvature to collimate the laser beam reflected by said enlarging mirror.

18. A composite laser machining apparatus comprising:
an unstable laser resonator including a convex or concave enlarging mirror having a partially transmissive central portion;
a collimating mirror arranged in opposing relation to said enlarging mirror for reflecting a laser beam, reflected by said enlarging mirror while being enlarged back to said enlarging mirror, for obtaining an output laser beam composed of a first laser beam portion passed through said central portion of said enlarging mirror and a second laser beam portion passed through the other non-reflecting portion of said enlarging mirror,
wherein a cutting, a welding and a surface treatment of a workpiece are performed by said output laser beam.

19. The composite laser machining apparatus as claimed in claim 18, wherein said means comprises a condensing element for condensing said output laser beam.

20. The composite laser machining apparatus as claimed in claim 19, wherein said condensing element has a variable focal length and said respective machinings are performed by changing the focal length of said condensing element.

21. The composite laser machining apparatus as claimed in claim 19, wherein a distance between said condensing element and said workpiece is variable and said respective machinings are performed by changing the distance.

* * * * *